United States Patent [19] [11] 4,042,666
Rice et al. [45] Aug. 16, 1977

[54] METHOD OF TREATING PHOSPHATE-CONTAINING MATERIAL TO REDUCE PROBLEM WITH CLAY SWELLING

[75] Inventors: Herbert L. Rice, Fort Worth; Roy A. Wilkins, Arlington, both of Tex.

[73] Assignee: Petrochemicals Company, Inc., Fort Worth, Tex.

[21] Appl. No.: 654,185

[22] Filed: Feb. 2, 1976

[51] Int. Cl.[2] .......................... C01F 1/00; C01F 5/00; C01F 11/00; C22B 26/20

[52] U.S. Cl. .......................... 423/167; 302/66; 423/320; 423/267; 423/555

[58] Field of Search .............. 423/167, 320, 266, 267, 423/555; 252/8.5 A; 210/58; 302/66, 14, 18; 137/13

[56] References Cited

U.S. PATENT DOCUMENTS

| | | | |
|---|---|---|---|
| 1,979,469 | 11/1934 | Johnson | 210/58 |
| 2,437,297 | 3/1948 | Garrison | 252/8.5 A |
| 3,035,867 | 5/1962 | Corbett | 302/66 |
| 3,423,172 | 1/1969 | Cafferata | 423/266 |
| 3,594,123 | 7/1971 | Encke et al. | 423/555 |
| 3,843,524 | 10/1974 | Perricone et al. | 252/8.5 A |
| 3,928,551 | 12/1975 | Booth | 423/320 |

FOREIGN PATENT DOCUMENTS

| | | | |
|---|---|---|---|
| 621,067 | 5/1961 | Canada | 423/195 |
| 44-21414 | 9/1969 | Japan | 423/555 |
| 1,202,083 | 2/1972 | United Kingdom | 423/555 |

*Primary Examiner*—O. R. Vertiz
*Assistant Examiner*—Eugene T. Wheelock
*Attorney, Agent, or Firm*—James C. Fails; Wofford, Felsman, Fails & Zobal

[57] ABSTRACT

In a method of treating clay-containing phosphate rock comprising at least mining the phosphate rock, reducing the phosphate rock to a predetermined size range, adding water to the phosphate rock, and storing the admixture containing at least the phosphate rock and water; the improvement characterized by adding to the admixture an amount effective to control problems associated with the swelling of residual clays of a chemical treatment selected from the class consisting of aliphatic hydroxy acids containing 2–6 carbon atoms, inclusive, of which citric acid and tartaric acid are members; the aliphatic hydroxy acid salts, and effective blends of the aliphatic hydroxy acid or the aliphatic hydroxy acid salts with a strong caustic, or base. The chemical treatment prevents a build up of viscosity such that the admixture remains pumpable even with a concentration of solids in excess of 66 percent by weight. Moreover, in phosphoric acid production, the quality of the calcium sulfate crystals is improved such that they are more readily removable by filtering. An effective amount of chemical treatment, preferably, is, for example, one pound per ton of phosphate rock and no more than about six pounds per ton (0.05–0.3 percent by weight).

23 Claims, 8 Drawing Figures

71% SOLIDS
68% SOLIDS
66% SOLIDS
65% SOLIDS
MIN. ACCEPT. FLUIDITY
SLURRY FLUIDITY GMS./MIN.
SLURRY HOLD, HRS.
5#/T
4#/T

METHOD OF TREATING PHOSPHATE-CONTAINING MATERIAL TO REDUCE PROBLEM WITH CLAY SWELLING

BACKGROUND OF THE INVENTION

1. Field of the Invention

This invention relates to a method of treating clay-containing phosphate rock. More particularly, this invention relates to a method of treating clay-containing phosphate rock to control problems associated with swelling of the clays when admixed with water. In particular embodiments, this invention relates to treatment of admixture of water and clay-containing phosphate rock, with or without added acid, to provide a plurality of benefits, including controlling problems associated with intolerable build up of viscosity because of swelling of the clays.

2. Description of the Prior Art

The prior art has seen a wide variety of processes involving phosphate rock. These processes have ranged from merely distributing the phosphate rock powder as a fertilizer in the early days of antiquity through the present sophisticated processes for beneficiating the phosphate rock to upgrade its phosphate content and processing through a wide variety of steps, including the addition of water either before or after comminution, or grinding the phosphate rock to a predetermined size range. The processes may be employed in making fertilizers of various sorts up to and including the addition of acid, such as sulfuric acid, for the manufacture of phosphoric acid. During the past 20 years, various phosphate industries have made rapid strides in cutting the cost of production and have allowed new and important phosphorus-containing materials to be introduced. The phosphorus industry has proved itself to be one branch of inorganic chemistry that has not been overshadowed by the fast moving organic chemical developments of recent years and has, in fact, joined with the rapidly moving organic chemical field to form phosphorus-organic compounds that are of increasing industrial importance each year. The processes have become increasingly sophisticated, each degree of sophistication having its own problem. In the early days of the Davy Powergas-Prayon Modern Dihyrate Process it was reported that the wet grinding of a phosphate rock before addition of a concentrated acid had unique advantages that allowed employing slurries with high concentrations of solids therein and solved most of the problems of the prior art. In practice, however, the clays in the phosphate rock tended to increase intolerably the viscosities of the slurries, and papers have been given reporting these intolerable increases in viscosities. Such problems have negated the advantages of the Modern Dihydrate Process, at least in part, by requiring the rather continuous dilution back of the slurries so as to render them pumpable. This has created problems handling large volumes of water, required room for dilution and decreased the capacity of storage vats, required the separation of large volumes of water, and diluted the phosphoric acid formed, as well as diluted the reactant acid. Moreover, as has been previously reported in the patent literature, such as U.S. Pat. No. 3,192,014, there is a long-standing problem of producing calcium sulfate crystals that can be readily filtered from the liquor containing the phosphoric acid. The reason for the dilution back requirement is that, in order for a plant to operate efficiently, the ground phosphate rock in water slurry has to be stored for a prolonged interval in order to ensure efficient operation and not have peaks and valleys in the production schedule. It has been found that a storage capacity of about 4 hours will provide the requisite efficiency. Of course, longer storage can be employed, if desired, but this adds to the cost and is not necessary.

In summary, it has become apparent that some chemical treatment is needed to alleviate the problem with the intolerable increasing in viscosity of the stored slurry, in addition to alleviating the other problems of the prior art processes. Conventional dispersants cannot be employed satisfactorily to prevent this intolerable build up over such a protracted storage interval, and the prior art has not provided a solution to this problem.

SUMMARY OF THE INVENTION

Accordingly, it is an object of this invention to provide an improvement in a method of treating clay-containing phosphate rock which alleviates the difficulties of the prior art and provides an efficient process for treating the phosphate rock.

In addition, it is an object of this invention to provide an improvement in a method of treating clay-containing phosphate rock that controls the problems associated witb intolerable increases in viscosity and swelling of the residual clays in the rock when admixed with water and stored.

It is a specific object of this invention to provide an improvement that controls problems associated with swelling of residual clays in a method of treating clay-containing phosphate rock in which the rock is admixed with water and acid for the production of phosphoric acid.

These and other objects will become apparent from the following descriptive matter.

In accordance with this invention, there is provided an improvement in a method of treating clay-containing phosphate rock in which the phosphate rock is mined, reduced to a predetermined size range (usually −200 mesh), admixed with water to form an admixture and stored. The improvement comprises adding to the admixture of the phosphate rock and water an amount effective to control problems associated with the swelling of residual clays, of a chemical treatment selected from a class known as lower aliphatic hydroxy acids containing from 2–6 carbon atoms and one or more hydroxyl groups per molecule, the water soluble salt (neutralization product) of the aliphatic hydroxy acid, or an effective blend of the aliphatic hydroxy acid or its salt with a strong alkali, or base, such as potassium hydroxide or sodium hydroxide. The chemical treatment prevents a build up of viscosity such that the admixture remains pumpable even with a concentration of solids in excess of 66 percent by weight. Moreover, when employed in an acidizing process to make phosphoric acid in which the chemical treatment is added before or with the acid (usually sulfuric) and time is allowed for digestion by the acid (usually sulfuric) and before the filtering of the calcium sulfate crystals, the quality of the calcium sulfate crystals is improved such that they are more readily removable by filtering.

The amount of the chemical treatment will depend upon the quality of the rock and the economics involved, as specifically described in the preferred embodiments hereinafter.

DESCRIPTION OF PREFERRED EMBODIMENTS

Figures 1, 2, 3, 4, 5, 6, 7, 8:
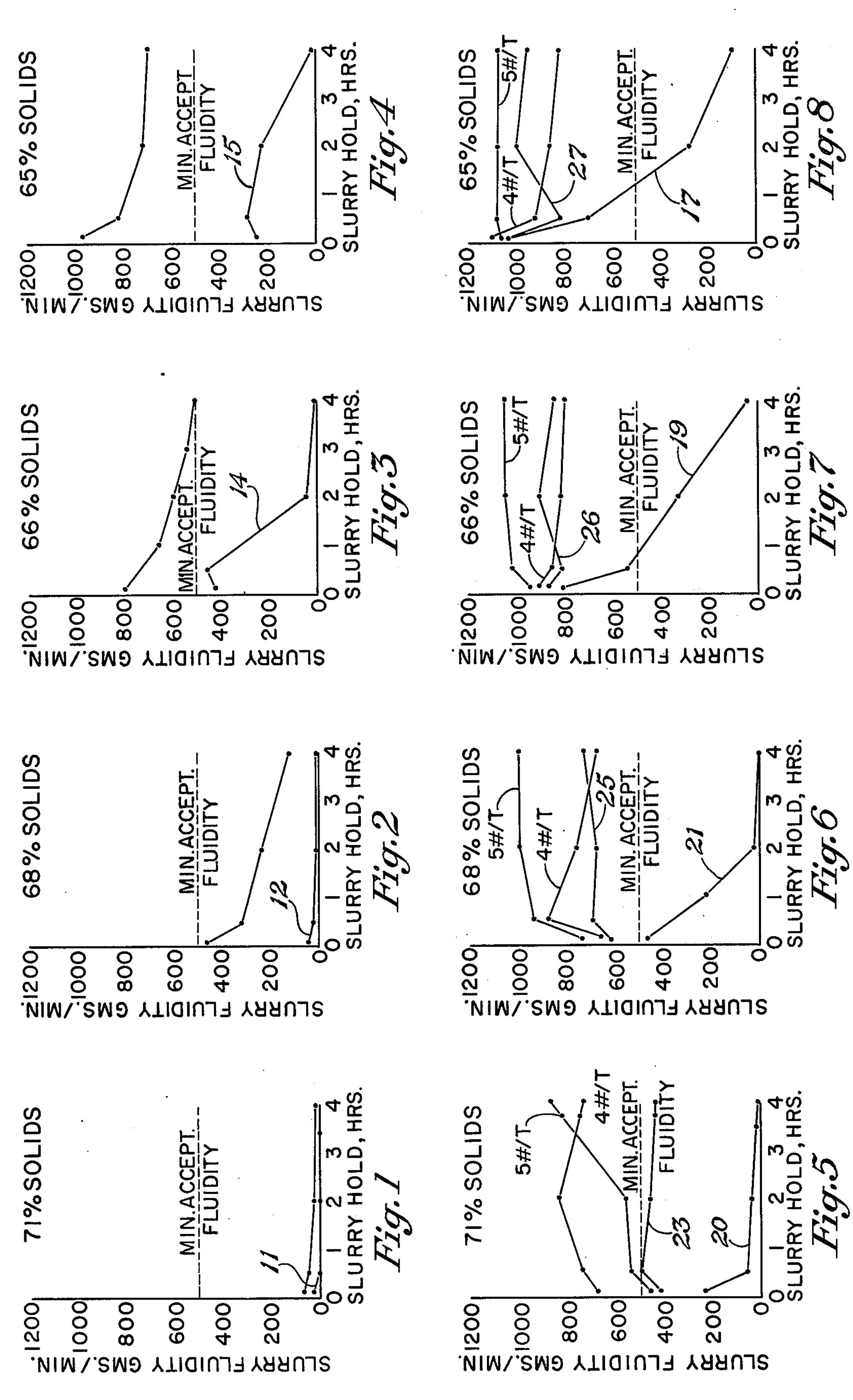
FIGS. 1–4 are respective graphs depicting the fluidity of the phosphate rock as a function of its storage time and solids content. The top curves are representative of high quality phosphate rock having minimal amounts of natural clays. The bottom curves in FIGS. 1–4 have 3 weight percent natural clays added to the phosphate rock depicted by the upper curves, the clays being enhanced in montmorillonite. The clay was separated in the rock beneficiation process and when added to the phosphate rock simulates the condition of the more troublesome phosphate rock encountered in the field.
FIGS. 5–8 are graphs depicting the fluidity of the respective slurries of clay-containing phosphate rock of FIGS. 1–4 following treatment in accordance with this invention.

As indicated hereinbelow, a wide variety of processes are employed for handling phosphate rock of varying degrees of purity. Frequently, the phosphate rock contains clays and other undesirable constituents that are separable therefrom only with great difficulty and expense. Accordingly, it is frequently advantageous to process the clay-containing phosphate rock with only the usual degree of beneficiation. Typical of the processes are those described in the text THE CHEMICAL PROCESS INDUSTRIES, R. Nash Shreve, First edition, Sixth impression, McGraw-Hill Book Company, INC., New York, 1945, pages 328–351, with flow diagrams at pages 330, 334, 341, 342, 344, 347 and 349. The material embodied in the foregoing reference is incorporated herein by reference for details that are omitted herefrom and show the conventional state of knowledge. Also, patents such as U.S. Pat. No. 2,049,032 describe such commercial processes as the Dorr Strong Acid Process. These processes note and graphically depict and describe the improvements made following World War I to render these processes commercially feasible. Even more modern technological improvements are described in KIRK-OTHMER ENCYCLOPEDIA OF CHEMICAL TECHNOLOGY, Second edition, Anthony Standen, Editor, Interscience Publishers, New York, 1969, under the volumes pertinent to fertilizers, phosphorus and its compounds, and phosphoric acid production and the like. The material embodied in the foregoing reference is incorporated herein by reference for details that are omitted herefrom and show the conventional state of knowledge. These processes and flow diagrams need not be repeated herein, since they are well known and readily acknowledged in the patents, such as the aforementioned U.S. Pat. No. 3,192,014. It is noteworthy that this invention may be advantageously employed by adding the chemical treatment at any stage in the handling of the phosphate rock. For example, the chemical treatment may be added even during the processing of the dry rock and before the water is added thereto. Ordinarily, however, it is advantageous to add the chemical treatment with or following the addition of the water, whether or not the acid is added at the same or closely to the same step.

While the method of this invention may be employed in a wide variety of processes for treating the clay-containing phosphate rock, this invention can be understood by description of its operation in the process of forming phosphoric acid. Consequently, that is the environment in which this invention will be described in detail hereinafter.

Specifically, the phosphate rock is mined in the locale where it is to be found. Rich deposits are found in Florida, Tennessee and the Western United States. Where the phosphate rock has a bone phosphate of lime content of less than about 65 percent, it is beneficiated by a process similar to that illustrated on page 330 of the above referenced CHEMICAL PROCESS INDUSTRIES, FIG. 1, page 330. Such beneficiation procedures frequently employ slurries, or admixtures, of the phosphate rock that has been reduced to a predetermined size range and water. Consequently, the method of this invention can be employed during the beneficiation phase, particularly where such admixtures of phosphate rock and water have to be stored for any period of time for efficiency in operation.

The mined phosphate rock is reduced to a predetermined size range. The reduction in size may occur in a plurality of steps, the first size being quite crude and relatively large in size. Water is added to the phosphate rock. In some cases, the rock will be ground dry and stored until both the water and acid are added. In the more modern processes, as implied hereinbefore, the water is added and the phosphate rock is ground wet, with the resulting slurry that passes through a predetermined size screen stored for providing efficient operation of the acidizing process in the modern plant.

In any event, acid is eventually admixed with the slurry of water and phosphate rock, whether initially or after a storage time of up to 4 hours. Time is allowed for digestion to take place. By "digestion" is meant the reaction of the acid, such as sulfuric acid that is typically added to react with the phosphate rock, to form a liquor that includes the phosphoric acid and a precipitate of calcium sulfate.

in the modern processes, a portion of the filtrate, being acid, is added to the slurry containing the water, phosphate rock and acid. This reduces the amount of water that has to be handled, but emphasizes the need for not having to dilute back the slurry. Moreover, the low acid filtrate from the last stages of filtration can be recycled and added to the comminuted, or ground, phosphate rock. These steps of recycling of portions of the filtrate are conventional and do not require exhaustive description herein.

Similarly, the withdrawal of the desired phosphoric acid and separation of the precipitate are conventional and do not require exhaustive description herein.

In accordance with this invention, the chemical treatment is preferably added to the phosphate rock at about the time the water is added thereto. The chemical treatment prevents the inordinate increase in viscosity and allows ready transport of the slurry, with or without the acid therein. Moreover, where added before the digestion time and the filtration, the chemical treatment improves the crystal structure of the gypsum crystals of calcium sulfate that are formed so they are more readily removed by filtering.

The chemical treatment is selected from the class consisting of lower aliphatic hydroxy acids having 2–6 carbon atoms, inclusive, such as citric acid, tartaric acid, gluconic acid, etc.; the salts of the lower aliphatic hydroxy acids, and effective blends of the salts of these acids with a strongly alkaline material. The strongly alkaline material is sometimes referred to hereinafter as simply "caustic", since it normally includes bases such as caustic soda or caustic potash. These acids are sometimes referred to simply as hydroxy acids, the aliphatic radical being assumed in the acid notation.

Early work included trying a number of conventional treatments to keep the viscosity of high solids phosphate rock slurries from increasing intolerably during storage. Among these were di- and tri-basic sodium phosphates, sodium tripolyphosphate and straight caustic (sodium hydroxide). Concentrations were used from 10 parts per million [ppm, or 0.001 percent (%) by weight] to 2,000 ppm (0.2%). While short term reductions in viscosities were sometimes observed, clay swelling was not prevented and such systems eventually developed unworkable viscosities if stored for a period of time less than that used in normal practice. Other chemicals known to be efficacious in certain instances were also tried without success. These included potassium chloride, detergents and wetting agents of both the non-ionic type and alkyl aryl sodium sulfonate, sodium sulfonate salts of lower and higher molecular weight naphthalene/formaldehyde condensates, lower and higher molecular sodium polyacrylates, sodium salts of sulfonated polystyrene ranging in molecular weights from 20,000 to ten million, and sodium lignosulfonates.

It was found that the lower aliphatic hydroxy acids, such as citric and tartaric acid alone, could do the job, although they are not conventional dispersants and were not reported to have any of the characteristics that would normally lead to their being employed for this purpose. Because of the expense of employing pure aliphatic hydroxy acids, their salts were tried and found to be effective. The salts are available commercially as the simple water soluble salts; such as, lithium, ammonium, or potassium salts. They can also be prepared by reacting in aqueous medium stoichiometric quantities of the organic acid and an inorganic base. Such salts were still expensive with today's technology. It was found that a blend of the aliphatic hydroxy acid salts and caustic could be employed to achieve the desired results. When the blend of the hydroxy acid of an alkali cation and caustic was employed, it was found that a surprising synergism began to be exhibited when as much as at least 10 percent by weight of the blend was the aliphatic hydroxy acid salt, sometimes referred to hereinafter as simply the hydroxy acid salt. Specifically, in a concentration of 10–50 percent by weight of hydroxy acid salt, the blend was more effective than the same concentration of either the hydroxy acid or the hydroxy acid salt alone. Since the caustic is much less expensive in today's technology, the blend therefore becomes the preferred embodiment.

About the optimum blend appears to be that blend having about 30 percent by weight of the hydroxy acid salt where the salt is a sodium salt and the strongly alkaline material is caustic soda (sodium hydroxide). Expressed otherwise, the hydroxy acid or its salt requires a concentration greater than three times as much as the concentration of hydroxy acid salt that is necessary when employed with a blend of caustic.

The hydroxy acids that are employed for the purpose of this invention are members of the lower aliphatic organic acids containing from 2–6 carbon atoms and having one or more hydroxyl groups and one or more carboxylic acid groups. The simplest acid, 2 carbons with one hydroxyl group and one carboxyl group is known a glycolic acid. Other members of this family are lactic acid (3 carbons, one hydroxyl, and one carboxyl), hydroxybutric acid (4carbons, one hydroxyl, one carboxyl), glyceric acid (3 carbons, 2 hydroxyls, one carboxyl), malic acid (4 carbons, 1 hydroxyl, and 2 carboxyls), tartaric acid (4 carbons, 2 hydroxyls, and 2 carboxyls), citric acid (6 carbons, 1 hydroxyl, and 3 carboxyls), and gluconic acid (6 carbons, 5 hydroxyls, and 1 carboxyl).

The preferred hydroxy acids are those most commonly available in large quantity, e.g. citric acid, gluconic acid, and lactic acid. Citric acid, whether prepared from corn starch or molasses, is readily available and may be used in impure form.

The term "caustic" is employed herein to mean the hydroxides of the alkali metal cations and includes lithium hydroxide, sodium hydroxide, potassium hydroxide, rubidium hydroxide, cesium hydroxide. As a practical matter, the sodium hydroxide or potassium hydroxide are the caustic that are most important economically.

Almost any salt of the hydroxy acid can be employed. This is particularly true in the blend, since the preferred amount of 10 percent to 50 percent by weight of the hydroxy acid in the blend with the strongly alkaline material such as caustic will result in converting the hydroxy acid salt to the cation of the caustic; e.g., the sodium or potassium salt; either in the dilute premix solution or in the phosphate rock system.

The acids may be used directly in the phosphate rock system or added as a salt, most commonly the sodium salt or other alkali or alkaline earth salt that is water soluble. To the same phosphate rock system may be added the strongly alkaline material by separate addition to achieve the right concentration of hydroxy acid, its salt, or its salt and strongly alkaline material in the optimum blend range. Or, the hydroxy acid or its salt may be premixed in a dilute aqueous solution to give an optimum blend with the alkaline material, the premix being then added to the phosphate rock system.

The reason for the efficacy of the chemical treatment in accordance with this invention is not clear. The mechanism cannot be delineated accurately. There are some observations that suggest that there is a particular size of molecule that may be involved. There are other mechanisms that suggest a control of electrical charges may be involved to inhibit the swelling, although the very narrow range of effective chemical treatments indicate that more is involved than mere control of charge. Despite the lack of clear theoretical explanation, the effectiveness is demonstrable and surprising.

The chemical treatment is employed in a concentration that will control the problems associated with the particular phosphate rock from which a slurry is made. The more nearly pure the phosphate rock is, in terms of its phosphate content, the less of the chemical treatment that is required. Of course, where the phosphate rock is pure enough, or has sufficiently small proportions of clay to not present any problems with increases in viscosity, none of the chemical treatment in accordance with this invention is necessary. Moreover, the concentrations that are employed may vary slightly depending upon whether the hydroxy acid alone, hydroxy salt alone, or the blend of the hydroxy salt and caustic is employed, the latter being more effective. It has been found preferable to employ, in those plants employing modern processes and having phosphate rock that contains troublesome quantities of clay, at least about one pound of chemical treatment per ton of phosphate rock. The more chemical treatment that is employed, the better the control of viscosity, the better the crystal forms that are produced and the better the slime is precipitated. Up to about 10 pounds or more of the chemical treatment per ton of phosphate rock can be employed, if desired. Ordinarily, the economics of a given process will dictate that no more than about six pounds per ton of chemical treatment be added to the phosphate rock. Expressed in a concentration, the concentration of the chemical treatment is from about 0.05 to about 0.3 percent by weight in the commercially significant processes that have been investigated. If employing the hydroxy acid or its alkaline salt as a single treatment in a troublesome phosphate rock, the preferred treatment level will be 3–5 pounds per ton of rock. A blend containing about 30 percent of the hydroxy acid or its salt with about 70 percent NaOH will preferably be used at 3–4 pounds per ton of rock.

The following Example illustrates an embodiment of this invention in which the chemical treatment of a Florida pebble phosphate rock slurry containing troublesome amounts of clay is investigated at treatment levels of from 2 to 5 pounds per ton and with solids levels up to 71 percent by weight of phosphate rock in the slurry.

Normally, the viscosity of a dispersion of phosphate rock may be difficult to measure by ordinary means. Before the clay has swelled sufficiently to permit suspension of the solids, settling will occur which results in variable and inaccurate readings. After a period of from 15 minutes to one hour, the clays begin to swell providing a sufficient viscosity increase to allow a slower settling of solids if the system is not under agitation. But this is still inadequate to permit accurate viscosity measurement. In the 2–4 hour time range, the viscosity becomes high enough to achieve the suspension of solids for a long enough period to use the Brookfield viscometer. At this point, however, the dispersion is on the verge of getting too thick to be pumped acceptably in the processes and equipment described in the preferred embodiments. Further viscosity increases lead to gelling if the dispersions are allowed to remain under agitation, or, in practice, undesirable dilution with water is required to reduce the viscosity.

In order to follow the changes in viscosity to demonstrate the effectiveness of this invention, and to circumvent the difficulties inherent in obtaining viscosity changes with time in systems with such high levels of solids not found in a true dispersed state, a method was devised whereby the viscosity could be related to a flow rate. The phosphate rock dispersion is prepared at between 65 percent and 71 percent by weight of solids in water in a beaker with constant stirring. The slurry is transferred to a glass funnel [about 500 cubic centimeters (cc) capacity] with neck about 25 millimeters (mm) in diameter. A plug has been cemented into the funnel neck flush with the bottom of the funnel cone containing a hole sufficient to allow containment of a ½ inch (½) internal diameter (i.d.) copper tube 4½ inches in length extending downward through the funnel neck. A mixer is positioned above the funnel. The blades on the stirring shaft are bent upward to parallel the cone angle of the funnel such that the rotating blades may be set just above the copper tubing. Three pipe cleaners are wound together and inserted into the bottom of the copper tubing and pushed upwards until they are flush with the opening of the copper tubing and the plug in the funnel neck. The phosphate rock slurry is then maintained under agitation in the funnel with no leakage until a "flow rate" reading is ready to be obtained. Flow of slurry beings at zero time with instant removal of the pipe cleaners. Flow under gravity is continued for a measured time and the amount of slurry collected beneath the funnel is weighed. A flow rate for the slurry is calculated and converted to grams per minute (gms./min.), which values appear as the ordinates in FIGS. 1-8. In this manner, it has been pragmatically established that a slurry having a flow rate of approximately 500 gms./min. has a Brookfield viscosity of 2,500–3,000 centipoises (cps) No. 4 spindle, 60 revolutions per minute (rpm), room temperature] and that this viscosity is considered to be the maximum viscosity acceptable for efficient operation in the processing of wet phosphate rock slurry. Conversely, the flow rate of 500 gms./min. would be considered the minimum value acceptable for satisfactory operations. Hence, in FIGS. 1-8, the minimum acceptable slurry flow rate is marked and defined at 500 gms./min. Values falling below the line are considered unacceptable, and values above or on the line are considered satisfactory. These values are used in the following examples. Percents (%) employed herein are percents by weight unless otherwise specified.

In FIGS. 1-4, the upper lines are flow rate readings taken by aging slurries of high quality phosphate rock containing a minimal amount of naturally occurring swelling clays (3%–5%). As these systems age, solids concentration must be kept below 66% to maintain adequate flow. in FIGS. 1-4, the lines marked 11, 12, 14, and 15, respectively, show the same phosphate rock to which has been added 3 weight percent of natural clay enhanced in montmorillonite which is found in a balled-up state in phosphate rock already beneficiated and ready to be slurried. Addition of the clay to the phosphate rock raises the level of natural clays to 5–8 percent by weight of the rock and simulates conditions encountered when this type of lower quality rock is actually encountered. It can be seen in lines 11, 12, 14, and 15, that this phosphate rock (with added clay), will not flow acceptably even at 65 percent solids.

EXAMPLE I

Phosphate rock of −200 mesh size to which had been added 3 weight percent of clay, described in the preceding, was slurried in water at various levels of solids content depicted in FIGS. 5-8 and aged for 4 hours. They were chemically treated at the outset and slurry flow rates were determined by the funnel flow method described hereinbefore.

a. A blend of 30 weight percent sodium citrate and 70 weight percent NaOH was used to provide acceptable flow of slurry at 2 pounds blend per ton of rock (0.1 percent) shown by line 17 of FIG. 8 at 65 percent solids and less than about 1.5 hours hold time.

b. The same treatment and concentration as (a) was used to obtain a satisfactory fluid flow at 66 percent solids shown by line 19 of FIG. 7 for less than 1 hour of aging. When treatment level was raised to 3 pounds per ton (0.15 percent), satisfactory flow of slurry over 4 hours was obtained. This is shown by line 26 of FIG. 7.

c. The same treatment and concentration as (a) was used in FIGS. 5 and 6 to obtain lines 20 and 21, respectively, in 71 percent and 68 percent slurries which resulted in inadequate flow. In FIG. 5, line 23, treatment was raised at 71 percent solids to 3 pounds per ton and found to be somewhat less than minimally adequate. Satisfactory flow conditions were achieved by raising treatment level to 4 pounds or 5 pounds per ton in FIG.

5. In FIG. 6, 3 pounds per ton of blend was found to be adequate to provide good flow conditions at 68 percent solids (line 25).

EXAMPLE II

The treated slurries of Example I, after aging, were reacted with 94 percent sulfuric acid to produce phosphoric acid and calcium sulfate crystals. In all cases, gypsum crystals formed in the process using the treated slurries were well formed and readily removed by filtration, in contrast to crystals from untreated rock slurries.

EXAMPLE III

A blend of 40 weight percent citric acid and 60 weight percent NaOH was used to obtain an acceptable flow condition at 3 pounds per ton at 66 percent solids (similar to that shown in line 26, FIG. 7) using phosphate rock containing 3 weight percent of added clay as used in Example I.

EXAMPLE IV

A blend of 20 weight percent citric acid and 80 weight percent NaOH was used to treat a slurry of phosphate rock with added clay as previously described to obtain acceptable flow qualities as shown in line 27, FIG. 8 at a level of 3 pounds per ton (0.15 percent) of solids.

EXAMPLE V

Citric acid was used by itself as a chemical treatment in FIG. 5 at 71 percent phosphate rock slurry (the rock containing 3 percent added clay) and 5 pounds per ton of citric acid was required to maintain an acceptable flow condition after 4 hours similar to that indicated by the 5 pounds per ton treatment (#/T) line indicated in FIG. 5. Use of 5 pounds per ton of sodium citrate by itself resulted in acceptable flow conditions although somewhat inferior to the flow rate obtained at 5 pounds per ton of citric acid.

EXAMPLE VI

A chemical treatment consisting of 30 weight percent sodium gluconate and 70 weight percent NaOH was prepared in dilute aqueous solution at a solids concentration of 6.4 weight percent. A slurry of high quality phosphate rock (no added clay) was prepared at 71.8 weight percent solids in water and became too thick to stir after 30 minutes. 593 grams of slurry was treated with 6.4 grams of the 6.4 weight percent solids blend of caustic/Na gluconate prepared above. This had the effect of reducing the phosphate rock solids to 71.1 percent and allowing a satisfactory flow condition to be obtained for the next 2 hours at a treatment level of 0.096 percent (or approximately 2 pounds per ton). The flow condition of the slurry deteriorated during this two hour period and 3.6 grams more of the 6.4 percent dilute chemical blend was added. This had the effect of lowering the phosphate rock solids level to 70.6 percent and raising the chemical treatment level to 0.15 percent (3 pounds per ton). A flow rate value of 623 gms./min. was obtained 1½ hours later (4 hours from start) and this good flow condition was maintained under agitation overnight without further deterioration.

EXAMPLE VII

A dilute solution containing 30 weight percent of tartaric acid and 70 weight percent NaOH was prepared and added along with make up water to high quality phosphate rock (containing no added clay) such that a dispersion was developed under agitation containing 71 percent phosphate rock and 3 pounds per ton of the caustic/tartaric acid blend based on phosphate rock. The initial slurry flow rate was 600 gms./min. and approached a very satisfactory value of about 700 gms./min. after 4 hours of aging.

EXAMPLE VIII

A blend of lactic acid with sodium hydroxide was prepared at 10 weight percent in water, the solids being 80 percent sodium hydroxide and 20 percent lactic acid. This blend was added along with dilution water to prepare a slurry of high quality phosphate rock in excess of 71 percent solids at a treatment level of 2½ pounds per ton (lbs./ton) based on rock solids. After 4 hours of aging, the slurry had a flow rate of 163 gms./min. At this point, the concentration of the chemical blend treatment was raised to 3 lbs./ton resulting in an increase of flow rate to 471 gms./min. This condition of marginally satisfactory flow was maintained for several additional hours of aging.

From the foregoing, it can be seen that this invention provides an improvement in the method of treating clay-containing phosphate rock that achieves the objects delineated hereinbefore while alleviating the disadvantages of the prior art processes.

Having thus described the invention, it will be understood that such description has been given by way of illustration and example and not by way of limitation, reference for the latter purpose being had to the appended claims.

What is claimed is:

1. In a process for treating clay-containing phosphate rock that includes the hydraulic transportation of finely divided phosphate rock wherein the phosphate rock is prepared in the form of an admixture of the phosphate rock in an aqueous slurry for handling; the improvement comprising the step of adding to said admixture a chemical selected from the class consisting of an aliphatic hydroxy acid containing 2–6 carbon atoms, inclusive; a water-soluble, inorganic salt of said aliphatic acid; and a blend of one of said aliphatic hydroxy acid and said salt of said aliphatic hydroxy acid with an alkali metal hydroxide; said chemical being added in at least an amount effective to reduce viscosity of said admixture at a predetermined time interval after addition below the viscosity of said admixture alone and such that said admixture can be pumped after 4 hours storage at concentrations of solids therein in excess of 65 percent by weight.

2. The process of claim 1 wherein said aliphatic hydroxy acid is selected from the class consisting of glycolic acid, lactic acid, hydroxybutyric acid, glyceric acid, malic acid, tartaric acid, citric acid, and gluconic acid.

3. The process of claim 1 wherein said aliphatic hydroxy acid is selected from the class consisting of lactic acid, citric acid, and gluconic acid.

4. The process of claim 3 wherein said aliphatic hydroxy acid is citric acid.

5. The process of claim 1 wherein said chemical comprises a blend of said alkali metal hydroxide and at least 10 percent by weight of said salt of said aliphatic hydroxy acid.

6. The process of claim 5 wherein the concentration of said salt of said aliphatic hydroxy acid is within the range of 10–50 percent by weight of said blend.

7. The process of claim 6 wherein the concentration of said salt of said aliphatic hydroxy acid is about 30 percent by weight of said blend.

8. The process of claim 1 including the further steps of:

a. adding sulfuric acid to said phosphate rock admixture;

b. allowing a predetermined time interval for digestion of said rock by said acid to take place and form a liquor and a precipitate comprising gypsum calcium sulfate; and c. filtering said liquor and precipitate to remove said calcium sulfate crystals from said liquor.

9. The process of claim 8 wherein said chemical is added simultaneously with said water to said phosphate rock and the resulting admixture is stored for a period of up to 4 hours before said acid is added.

10. The process of claim 9 wherein said water is added to said phosphate rock before the phosphate rock is reduced to a predetermined size range; the resulting slurry formed by grinding said phosphate rock in said water is stored for a period of up to 4 hours before said acid is added; and the filtrate from the first part of the step of filtering of step (c) of claim 8 to remove said calcium sulfate crystals is recycled as acid to be added to said phosphate rock in step (a).

11. The process of claim 8 wherein said chemical is also added in an amount effective to provide improved crystal growth of gypsum calcium sulfate crystals that are more readily filterable from said liquor.

12. The process of claim 11 wherein said chemical is present in said admixture in a proportion of at least one pound per ton of phosphate rock and no more than about 10 pounds per ton of phosphate rock.

13. The process of claim 12 wherein said chemical is present in an amount within the range of 2–6 pounds per ton of phosphate rock.

14. The process of claim 8 wherein said water, said acid and said chemical are added simultaneously to phosphate rock that has been reduced to a predetermined size range.

15. The process of claim 14 wherein filtrate from the step of filtering in step (c) of claim 8 is recycled to be admixed with said phosphate rock in step (a).

16. The process of claim 14 wherein said chemical is present in a proportion of at least one and no more than 10 pounds per ton of phosphate rock.

17. The process of claim 16 wherein said chemical is present in the range of 2–6 pounds per ton of phosphate rock.

18. The process of claim 1 wherein said phosphate rock is beneficiated prior to the preparation of said phosphate rock slurry so as to increase the proportion of phosphate therein.

19. The process of claim 1 wherein said chemical is added in an amount of at least 0.05 percent by weight.

20. The process of claim 1 wherein said chemical is present in said admixture in a proportion of at least 1 pound per ton of phosphate rock and no more than about 10 pounds per ton of phosphate rock.

21. The process of claim 20 wherein said chemical is present in an amount within a range of 2–6 pounds per ton of phosphate rock.

22. In a process for treating clay-containing phosphate rock that has been comminuted and that includes the steps of:

a. adding sulfuric acid to said phosphate rock;

b. allowing a predetermined time interval for digestion of said rock by said acid to take place and form a liquor and a precipitate comprising calcium sulfate; and c. filtering said liquor and precipitate to remove said calcium sulfate crystals from said liquor; the improvement comprising adding to said phosphate rock and acid a chemical selected from the class consisting of an aliphatic hydroxy acid containing 2–6 carbon atoms, inclusive; a water-soluble, inorganic salt of said aliphatic hydroxy acid; and a blend of one of said aliphatic hydroxy acid and said salt of said aliphatic acid with an alkali metal hydroxide; said chemical being added in an amount sufficient to improve the crystals of calcium sulfate that are formed so they are more readily removed by filtering as compared to calcium sulfate crystals that are formed by said phosphate rock and sulfuric acid alone and without said chemical treatment.

23. In a process for treating clay-containing phosphate rock that has been comminuted and includes the step of adding an aqueous medium to said phosphate rock for handling, the improvement comprising adding a concentration within the range of 0.05–0.5 percent by weight of a chemical selected from the class consisting of an aliphatic hydroxy acid containing 2–6 carbon atoms, inclusive; a water-soluble, inorganic salt of said aliphatic hydroxy acid; and a blend of one of said aliphatic hydroxy acid and said salt of said aliphatic hydroxy acid with an alkali metal hydroxide.

* * * * *